United States Patent [19]

Brehm et al.

[11] Patent Number: 5,284,317
[45] Date of Patent: Feb. 8, 1994

[54] PRESSURE CONTROL VALVE

[75] Inventors: Werner Brehm, Hemmingen; Reiner Kimmich, Bietigheim-Bissingen, both of Fed. Rep. of Germany

[73] Assignee: Robert Bosch GmbH, Stuttgart, Fed. Rep. of Germany

[21] Appl. No.: 764,139

[22] Filed: Sep. 20, 1991

[30] Foreign Application Priority Data

Nov. 10, 1990 [DE] Fed. Rep. of Germany ....... 4035853

[51] Int. Cl.$^5$ .............................................. F16K 31/06
[52] U.S. Cl. ........................... 251/129.08; 251/129.15
[58] Field of Search ..................... 251/129.15, 129.08

[56] References Cited

U.S. PATENT DOCUMENTS

| | | | |
|---|---|---|---|
| 4,361,309 | 11/1982 | Sogabe | 251/129.08 |
| 4,513,945 | 4/1985 | Otsuki et al. | 251/129.15 |
| 4,909,475 | 3/1990 | Triolo et al. | 251/129.15 X |
| 4,966,195 | 10/1990 | McCabe | 251/129.08 X |

*Primary Examiner*—Arnold Rosenthal
*Attorney, Agent, or Firm*—Michael J. Striker

[57] ABSTRACT

A pressure control valve has a substantially closed housing, an armature provided with an integrated valve body, a valve seat with which the valve body cooperates, a spring acting on the valve body so that the valve body cooperates with the valve seat, an electromagnet arranged to adjust a control pressure. The magnet armature is somewhat bucket-shaped. A projection extends in an interior of the housing and operates for guiding a magnetic flux. The magnet armature surrounds the projection and is mounted on the valve body in a friction-transmitting manner. A second spring acts on the valve body so as to counteract an action of the first mentioned spring.

3 Claims, 1 Drawing Sheet

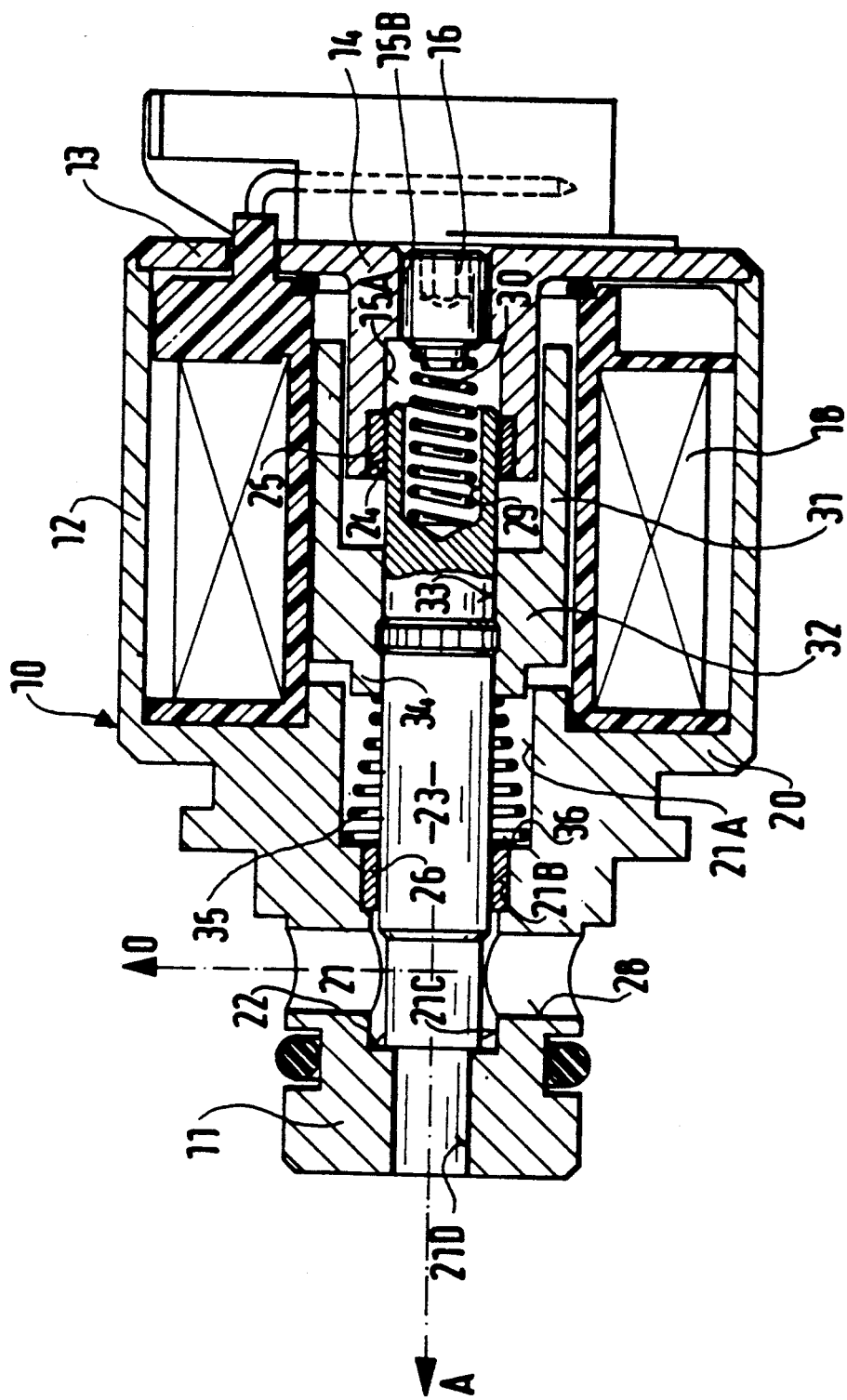

PRESSURE CONTROL VALVE

BACKGROUND OF THE INVENTION

The present invention relates to pressure control valves. More particularly it relates to pressure control valves having a substantially closed housing, an armature arranged in the housing and having an integrated valve body which cooperates with the valve seat under the action of a spring.

Pressure control valves of the above mentioned general type are known in the art. In such valves the control pressure can be adjusted by a proportional magnet which acts as an actuating an adjusting device. The control curve of such a pressure control valve is dependent on the manufacturing and mounting tolerances to a high degree and especially on axial distance of magnet armature from the valve housing with the given distance of the valve body from the valve seat. Occurring deviations change the characteristic curve of each individual valve considerably so that often expensive adjusting steps must be taken. Moreover, such pressure control valves are long and have a tendency to be unstable in the control region, especially in the sense of deviation over the control point.

SUMMARY OF THE INVENTION

Accordingly, it is an object of the present invention to provide a pressure control valve which avoids the disadvantages of the prior art.

More particularly, it is an object of the present invention to provide a pressure control valve which can be very short and which dampens the movements of the valve member and armature with the oil-filled armature space and therefore prevent deviations beyond the adjusting or regulating value.

In keeping with these objects and with others which will become apparent hereinafter, one feature of the present invention resides, briefly stated, in a pressure control valve of the above mentioned type in which the magnet armature is substantially bucket-shaped and partially surround a projection which extends in the interior of the housing and serves for magnetoc flux guidance, the magnet armature is frictionally mounted on the valve body, and another spring in addition to the first spring is arranged on the valve body and counteracts the action of the first spring which biases the valve body toward the valve seat.

When the pressure control valve is designed in accordance with the present invention it eliminates the disadvantages of the prior art and provides for the above mentioned advantageous results. It can made very short and it dampens the movements of the valve member and the armature with the oil filter armature space to prevent deviations over the adjusting and control valve. Also, due to the special construction of the valve a very accurate adjustment of the distance between the valve seat and the magnet armature is possible, so that the manufacturing and mounting tolerances can be compensated.

In accordance with another feature of the present invention, the valve body is supported in the housing on two bearing points provided in the housing.

Still another feature of the present invention is that the valve seat is formed as a flat seat, while the valve body is provided with a correspondingly designed flat end side.

Finally, the adjustment of the first mentioned spring can be changed by an adjusting screw.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view which schematically shows a pressure control valve in accordance with the present invention.

DESCRIPTION OF THE PREFERRED EMBODIMENT

A pressure control valve has a housing 10 composed of a valve housing 11 and a bucket-shaped magnet housing 12. The magnet housing 12 is closed by a cover 13 which is provided with a cylindrical projection 14 extending into the interior of the housing. The projection 14 forms a through-going stepped longitudinal opening 15A, 15B. Its opening portion 15B extending from the outer side of the cover 13 has a smaller diameter and is closed by an adjusting screw 16. A magnet coil 18 is arranged in the interior of the magnet housing. Its inner diameter is greater than the outer diameter of the projection 14.

The magnet housing has a bottom 20. An axially extending three-step opening 21 extends from the bottom 20 through the valve housing 11. The individual opening portions, starting from the bottom 20 of the magnet housing, are identified as 21A, 21B, 21C and 21D. The flat shoulder formed between the opening portions 21D and 21C serves as a valve seat 22 which cooperates with a flat end side of the cylindrical valve body 23. The outer diameter of the valve body 23 at its end which faces the valve seat 22 is smaller than the diameter of the opening portion 21C. The opposite end of the valve body extends in the opening portion 15A of the projection 14 and there is supported in a sliding ring 25 which is inserted in an annular groove 24. A further sliding ring 26 is fixedly inserted in the opening portion 21B and serves as a support of the valve body 23. The valve seat 22 is connected through an opening portion 21D with the not shown pressure medium source. Its connection is identified with reference A. The pressure medium discharge is performed through a transverse opening 28 which extends through the valve housing in the region of the opening portion 21C. The transverse opening 28 is connected with a not shown container whose connection is identified as O.

The end of the valve body which extends into the opening portion 15A has an axially extending blind hole 29 which starts from the end side. A pressure spring 30 abuts against the bottom of the blind hole, while its opposite end abuts against an adjusting screw 16. Under the action of the spring 30, the valve body 23 is pressed against the valve seat 22. A substantially bucket-shaped magnet armature 31 is mounted in a friction-transmission manner on the valve body 23 in the region of the inner space of the magnet coil 18, so that its bottom 32 faces toward the valve housing 11. The bottom is provided with a longitudinal opening 23 for the friction-transmitting mounting. The outer diameter of the magnet armature 31 is somewhat smaller than the inner diameter of the coil 18, and its inner diameter is somewhat greater than the outer diameter of the projection 14, which extends in the interior of the magnet armature.

A projection 34 is provided at the lower side of the bottom 32 of the magnet armature 31. It extends in the opening portion 21A, and its diameter is smaller than the diameter of this opening portion. A second pressure spring 35 is supported on the projection 34, while its opposite end abuts against the shoulder 36 between the opening portions 21B and 21A.

Due to the second spring 35 the action of the first spring 30 can be made weaker or compensated so that the characteristic of the valve can be adjusted in any desirable manner.

When the magnet is not supplied with current and the connection A does not have pressure, with the respectively adjusted spring the pressure control valve is closed. In other words, the valve body 23 abuts against the valve seat 22. Therefore, the opening portion 21D which is connected with the pressure medium source is closed at one end. When the pressure built up in the opening portion 21D exceeds the force at the end surface of the valve body 23, by a value which is greater than the difference between the force of the spring 30 and the counteracting spring 35, the valve body 23 is lifted from its seat. Thereby, the pressure medium connections A and O are connected through the opening portions 21D and 21C as well as the transverse opening 28 so that the pressure medium is discharged. Thereby a pressure regulation or pressure reduction is obtained of the pressure medium stream which flows to A for actuation of a consumer. Simultaneously, the pressure medium passes through the bearing gap between the sliding ring 26 and the valve body 23 and reaches the interior of the magnet housing 12, so that it is filled with the pressure medium. Through the bearing gap between the sliding ring 25 and the valve body 23 the pressure medium reaches the opening portion 15A.

If the pressure control valve is used for example in a transmission of a motor vehicle, the pressure control valve can be filled with the pressure medium during the mounting and built in under the oil level. The magnet housing is then filled with the pressure medium before the building-in and actuation.

By the respective control of the proportional magnets, the pressure can be increased, as required for opening of the valve.

Due to pressure medium filling of the magnet housing 12 and also the pressure medium filled long gaps between the magnet armature 31 and magnet coil 18 as well as between the magnet armature 31 and the projection 14, a hydraulic damping is obtained which reduces the instabilities of the control conditions. A further damping effect is produced due to the volume change of the pressure medium accommodated in the valve housing during the movement of the magnet armature and the valve body. For this purpose, the pressure medium must pass through the small bearing gaps between the sliding rings 25, 26 and the valve body 23. The thusly adjusted further damping effect increases with a reducing bearing gap.

Due to the shaping of the magnet armature which partially surrounds the projection 14 serving for the magnetic flux, the pressure control valve can be made especially short.

Due to the friction-transmitting mounting of the armature on the valve body, the axial air gap between the magnet armature 31 and the bottom 20 of the magnet housing during the mounting of the pressure control valve can be adjusted with respect to the valve seat 22, for example by an adjusting disc. Therefore, this value can be maintained independent of the manufacturing and mounting tolerances connected with the tool and therefore maintained approximately constant.

Due to the remote location of the bearing points of the valve body from one another and therefore of the magnet armature, the eccentricity can be maintained very low. Therefore, the magnetic transfer forces and the hysteresis of the control curve of the valve is also maintained very small.

It will be understood that each of the elements described above, or two or more together, may also find a useful application in other types of constructions differing from the types described above.

While the invention has been illustrated and described as embodied in a pressure control valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure control valve, comprising a substantially closed housing; an armature provided with an integrated valve body; a valve seat with which said valve body cooperates; a spring acting on said valve body so that said valve body cooperates with said valve seat; an electro-magnet arranged to adjust a control pressure, said magnet armature being somewhat bucket-shaped; a projection extending in an interior of said housing and operating for guiding a magnetic flux, said magnet armature surrounding said projection and being mounted on said valve body in a friction-transmitting manner; a second spring acting on said valve body so as to counteract an action of said first mentioned spring; and means for adjusting a tensioning of said first mentioned spring, said valve seat being formed as a flat seat, said valve body being provided with a flat end side corresponding to said flat seat and cooperating with the latter.

2. A pressure control valve as defined in claim 1; and further comprising two bearing points provided in said housing and supporting said valve body.

3. A pressure control valve as defined in claim 1, wherein said adjusting means includes an adjusting screw adapted to adjust the pretensioning of said first spring.

* * * * *